United States Patent
Lee

(10) Patent No.: US 8,531,442 B2
(45) Date of Patent: Sep. 10, 2013

(54) DISPLAY DEVICE WITH PERSONAL IDENTIFICATION FUNCTION AND CONTROL METHOD THEREOF

(71) Applicant: Au Optronics Corporation, Hsinchu (TW)

(72) Inventor: I-Shu Lee, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/662,568

(22) Filed: Oct. 29, 2012

(65) Prior Publication Data

US 2013/0050163 A1 Feb. 28, 2013

Related U.S. Application Data

(62) Division of application No. 12/581,156, filed on Oct. 18, 2009, now Pat. No. 8,325,168, which is a division of application No. 11/160,593, filed on Jun. 30, 2005, now abandoned.

(30) Foreign Application Priority Data

Jan. 17, 2005 (TW) .............................. 94101264 A

(51) Int. Cl.
*G06F 3/038* (2013.01)

(52) U.S. Cl.
USPC ............................. 345/204; 726/35; 713/184

(58) Field of Classification Search
USPC .................................................. 345/169, 204
See application file for complete search history.

(56) References Cited

U.S. PATENT DOCUMENTS

| 4,959,860 | A * | 9/1990 | Watters et al. | 726/19 |
| 7,222,131 | B1 * | 5/2007 | Grewal et al. | 717/168 |
| 2003/0074577 | A1 * | 4/2003 | Bean et al. | 713/200 |

\* cited by examiner

*Primary Examiner* — Duc Dinh
(74) *Attorney, Agent, or Firm* — Jianq Chyun IP Office

(57) ABSTRACT

A display device is provided, and which includes a display panel; a gate and a source driving circuits, both coupled to the display panel, for driving the display panel; and a timing control circuit, coupled to the gate and the source driving circuits, for controlling the operations of the gate and the source driving circuits, wherein the timing control circuit comprises a personal identification circuit, and the personal identification circuit is used for receiving an input data; decoding a stored image to obtain decoded data; accumulating the decoded data to obtain an accumulated value; adding the accumulated value to the input data to obtain a compared value; setting the display device to operate normally and output images through the display panel when the compared value is identical to an initial value; and displaying a preset frame on the display panel when the compared value is different from the initial value.

4 Claims, 4 Drawing Sheets

DISPLAY DEVICE WITH PERSONAL IDENTIFICATION FUNCTION AND CONTROL METHOD THEREOF

CROSS-REFERENCE TO RELATED APPLICATION

This application is a Divisional of and claims the priority benefit of U.S. patent application Ser. No. 12/581,156, filed on Oct. 18, 2009, now pending. The prior application Ser. No. 12/581,156 is a divisional application of U.S. Ser. No. 11/160,593, filed on Jun. 30, 2005, which claims the benefit of Taiwan Application No. 94101264, filed on Jan. 17, 2005. The entirety of each of the above-mentioned patent applications is hereby incorporated by reference herein and made a part of specification.

BACKGROUND OF THE INVENTION

1. Field of the Invention

The present invention relates to a timing control circuit. More particularly, the present invention relates to a timing control circuit with personal identification function.

2. Description of the Related Art

With the rapid development of multi-media technologies, image data is now transmitted mostly in digital format instead of analogue format. To keep up with modern lifestyle, the size and volume of video or image devices continue to reduce. Although the traditional cathode ray tube (CRT) display has good display quality and relatively low production cost, the bulkiness of electron tube structure renders the miniaturization and the reduction of power consumption difficult. Moreover, the presence of radiation is always a potential hazard to the eyes of the users. Consequently, with the maturity of photo-electronic and semiconductor fabrication techniques, many types of flat panel displays have been produced and become popular. Liquid crystal display (LCD) is one type of the flat panel displays that has many advantages including low operating voltage, radiation-free operation, light weight and small size. Hence, liquid crystal display has gradually replaced the conventional CRT to become one of the mainstream products in recent years.

FIG. 1 is a block diagram showing the internal structure of a conventional liquid crystal display device. As shown in FIG. 1, the liquid crystal display device includes a liquid crystal display panel 101 having a plurality of data lines DL and scan lines SL. A gate driving circuit 103 is coupled to the liquid crystal display panel 101 through the scan lines SL and a source driving circuit 105 is coupled to the liquid crystal display panel 101 through the data lines DL. The liquid crystal display device further comprises a timing control circuit 110. According to a video data DDATA, a clock signal CLK, a data enable signal DE, a horizontal synchronous signal HSYNCH and a vertical synchronous signal VSYNCH, the timing control circuit 110 controls the timing of the source driving circuit 105 and the gate driving circuit 103. Thus, the liquid crystal display panel 101 is able to output an image.

The timing control circuit 110 further comprises a driving control unit 112 and a video processor 114. The driving control unit 112 controls the timing of the gate driving circuit 103 according to the vertical synchronous signal (VSYNCH) so that each scan line SL is driven in sequence. Similarly, the driving control unit 112 controls the timing of the source driving circuit 105 according to the horizontal synchronous signal (HSYNCH) so that each data line DL is driven in sequence. The video processor 114 transmits video data DDATA to the source driving circuit 105 according to the clock signal CLK and the data enable signal DE. Furthermore, the video processor 114 controls the source driving circuit 105 to transmit the video data DDATA from each data line DL to the liquid crystal display panel 101 in sequence so that an image is displayed.

Due to the rapid development of liquid crystal display technologies, the range of the technology applications is increasing every day. At present, the common applications include mobile phones, personal digital assistants (PDA), liquid crystal display (LCD) monitors, LCD televisions, notebooks, tablet PCs and so on. Since most liquid crystal displays are light, slim, and portable, they can also be easily stolen. Due to the portability characteristic, an LCD device may be spotted by a thief at any minute if the user does not closely keep an eye on his/her property.

SUMMARY OF THE INVENTION

Accordingly, at least one objective of the present invention is to provide a timing control circuit with personal identification function for identifying whether the user of the display device is really the owner of the display device or not so that the risk of being stolen can be significantly reduced.

To achieve this and other advantages and in accordance with the purpose of the invention, as embodied and broadly described herein, the invention provides a timing control circuit with personal identification function suitable for a display device. The timing control circuit includes a driving control unit, a video processor and a personal identification circuit. The driving control unit controls the display device according to a horizontal synchronous signal and a vertical synchronous signal. The video processor transmits video data to the display device according to a clock signal and a data enable signal so that an image is displayed on the display device. In addition, the personal identification circuit compares the data input by a user with internally stored data and determines if the video processor should operate normally according to the result of comparison.

In the embodiment of the present invention, the personal identification circuit further comprises an interface unit and a memory control unit. The interface unit receives input data from the user and the original stored data inside the personal identification circuit and temporarily stores the data inside a memory device through the memory control unit. Furthermore, the personal identification circuit also includes a decoder, an accumulator and a comparator. The decoder is coupled to the memory control unit for decoding the output from the memory control unit and transmitting the decoded data to the accumulator for accumulation. The comparator controls the video processor according to the input of the user, the output from the accumulator and the internal data stored inside the personal identification circuit.

According to another perspective, the present invention also provides an alternative display device with personal identification function. The display device includes a display panel, a gate driving circuit and a source driving circuit. The gate driving circuit is coupled to the display panel through a plurality of scan lines. According to a vertical synchronous signal, the gate driving circuit drives each scan line in sequence. Similarly, the source driving circuit is coupled to the display panel through a plurality of data lines. According to a horizontal synchronous signal, the source driving circuit drives each data line in sequence. In addition, the present invention also includes a timing control circuit coupled to the gate driving circuit and the source driving circuit. It should be noted that the timing control circuit of the present invention could rely on the result of comparing the input from a user with the internal data stored inside the timing control circuit to control the timing of the gate driving circuit and the source driving circuit.

The present invention also provides a method of controlling a display device that includes the following steps. First, an input data is received and then a stored image is decoded to obtain a decoded data. Thereafter, the decoded data is accumulated to obtain an accumulated value. When the input data and an original data are identical and the accumulated value equals an initial value, the display device operates normally. On the contrary, if there is a mismatch between the input data and the original data or the accumulated value differs from the initial value, then a preset frame is output.

According to another perspective, the present invention also provides another method of controlling a display device that includes the following steps. First, an input data is received and a stored image is decoded to obtain a decoded data. Thereafter, the decoded data is accumulated to obtain an accumulated value. Then, the input data and the accumulated value are added together to obtain a compared value. When the compared value is identical with a first initial value, the display device operates normally. On the contrary, if the compared value differs from the initial value, then the display device outputs a preset frame.

According to another perspective, the present invention also provides yet another method of controlling a display device that includes the following steps. First, the input data from a user is received. According to the input data and an internally stored data inside the display device, whether the display device should operate normally or not is determined.

In the embodiment of the present invention, the input data from a user includes an input code and the internally stored data inside the display device includes a stored image, an original code and an initial value.

In brief, due to the presence of a personal identification circuit in the present invention, whether the user is the owner of the liquid crystal display device or not can be easily identified through matching the user's input data with an original data. Ultimately, the desire for stealing a liquid crystal display device is significantly reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
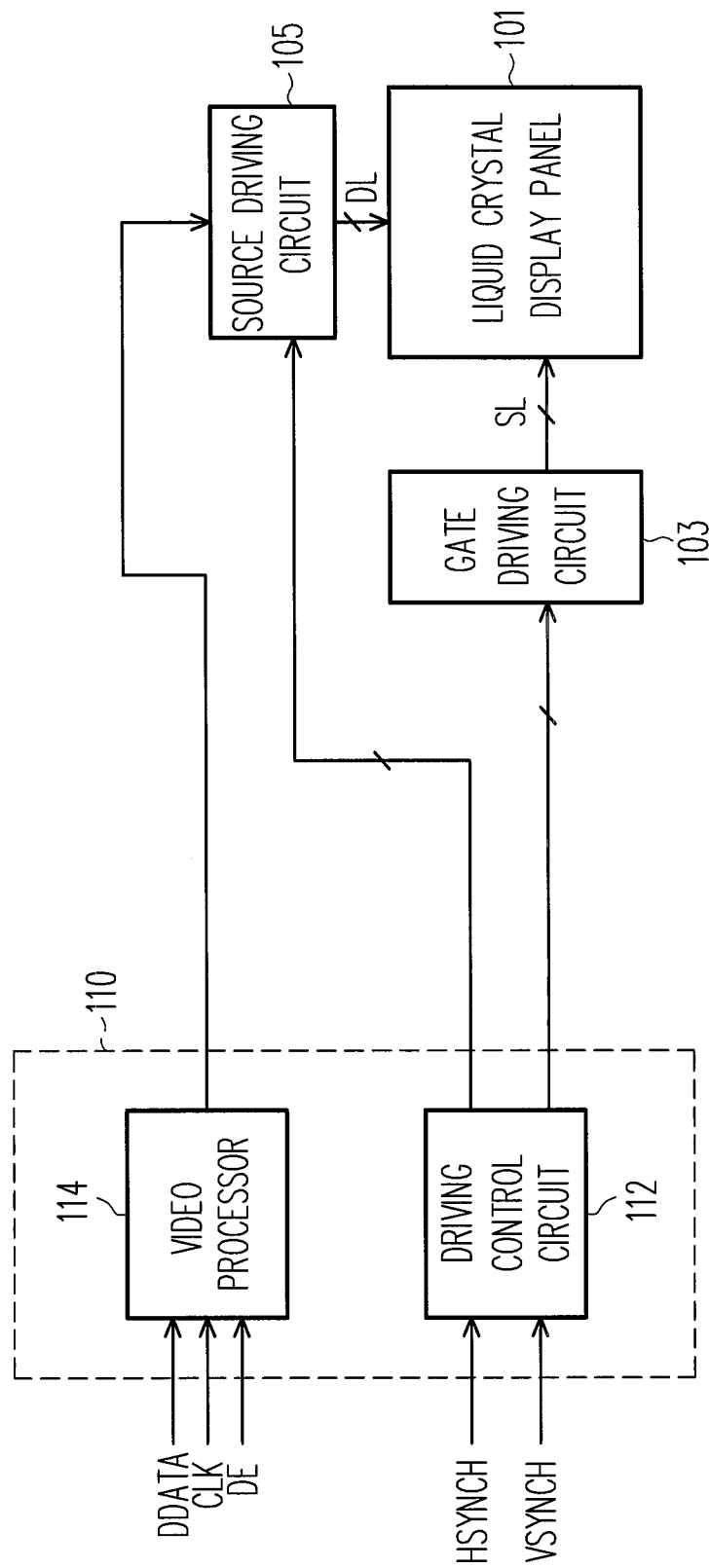
FIG. 1 is a block diagram showing the internal structure of a conventional liquid crystal display device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
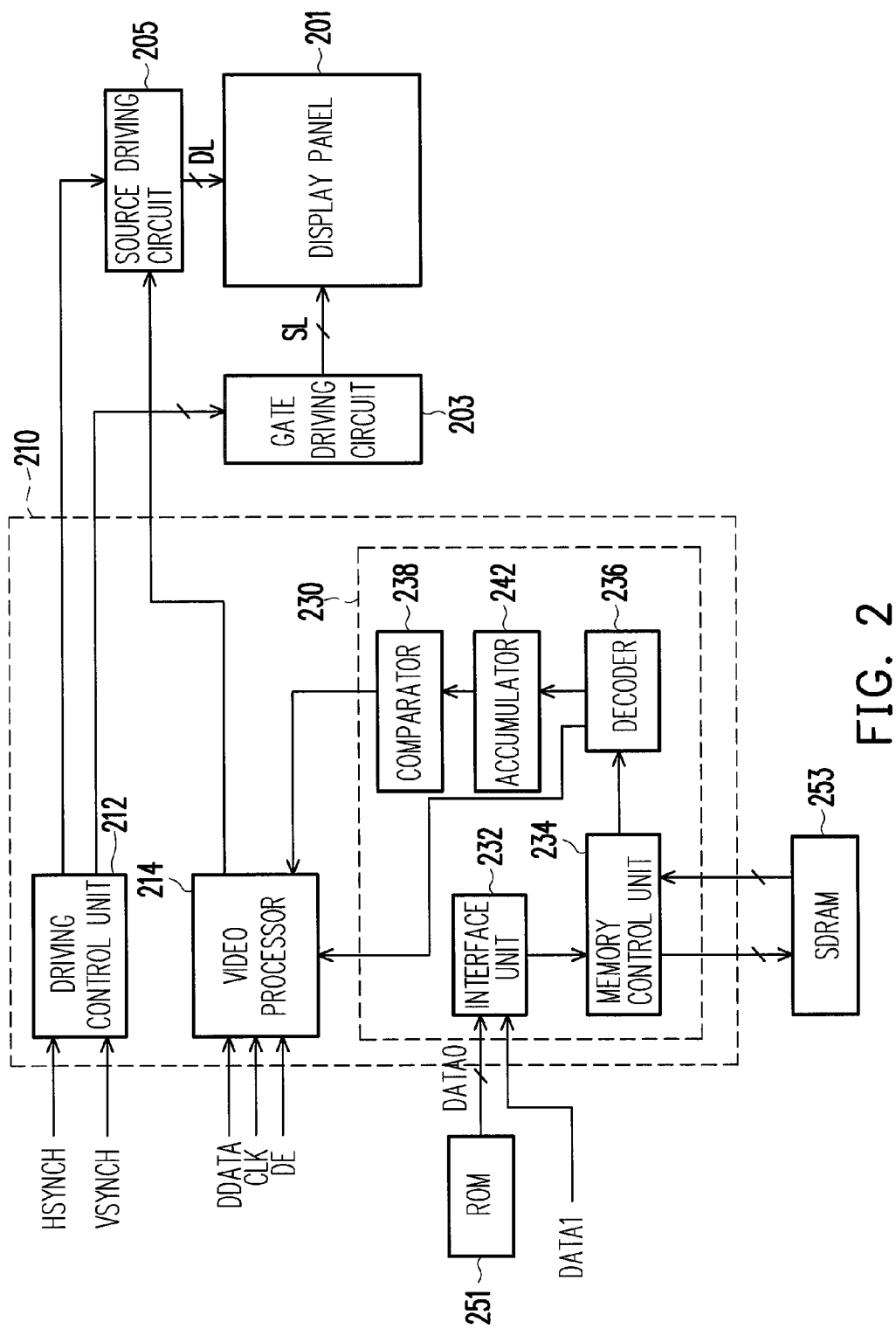
FIG. 2 is a block diagram of a timing control circuit with personal identification function according to one preferred embodiment of the present invention.

FIG. 2 is a block diagram of a timing control circuit with personal identification function according to one preferred embodiment of the present invention. In the present invention, a display panel 201 is provided. The display panel 201 has a plurality of scan lines SL and data lines DL attached thereon. In the present embodiment, the display panel 201 comprises a liquid crystal display panel. The present invention also includes a gate driving circuit 203 and a source driving circuit 205. The gate driving circuit is coupled to the display panel 201 through the scan lines SL and the source driving circuit 205 is coupled to the display panel 201 through the data lines DL.

In the present invention, a timing control circuit 210 controls the gate driving circuit 203 and the source driving circuit 205. As shown in FIG. 2, the timing control circuit 210 receives a horizontal synchronous signal (HSYNCH), a vertical synchronous signal (VSYNCH), a video data DDATA, a clock signal CLK and a data enable signal DE. It should be noted that the timing control circuit 210 could decide whether the display device operates normally or not according to the user's input data DATA1 after the display device of the present invention is activated. The data DATA1 can be a coded series, for example.

A driving control unit 212 and a video processor 214 are disposed inside the timing control circuit 210. The driving control unit 212 controls the timing of the source driving circuit 205 and the gate driving circuit 203 according to the horizontal synchronous signal (HSYNCH) and the vertical synchronous signal (VSYNCH) respectively. The video processor 214 transmits video data DDATA to the source driving circuit 205 according to the clock signal CLK and the data enable signal DE. In particular, a personal identification circuit 230 is disposed inside the timing control circuit 210. The personal identification circuit 230 is coupled to a memory device such as a read-only-memory (ROM) 251 and a synchronous dynamic random access memory (SDRAM) 253. In addition, the personal identification circuit 230 receives the input data DATA1 provided by the user to control the video processor 214 accordingly.

Furthermore, an interface unit 232 is disposed inside the personal identification circuit 230 for receiving the data DATA1 and the ROM 251. The output of the interface unit 232 is coupled to the input of a memory control unit 234. The memory control unit 234 accesses the data residing in the SDRAM 253. The output of the memory control unit 234 is coupled to a decoder 236 and the output from the decoder 236 is transmitted to a comparator 238 through an accumulator 242.

Figure 3:
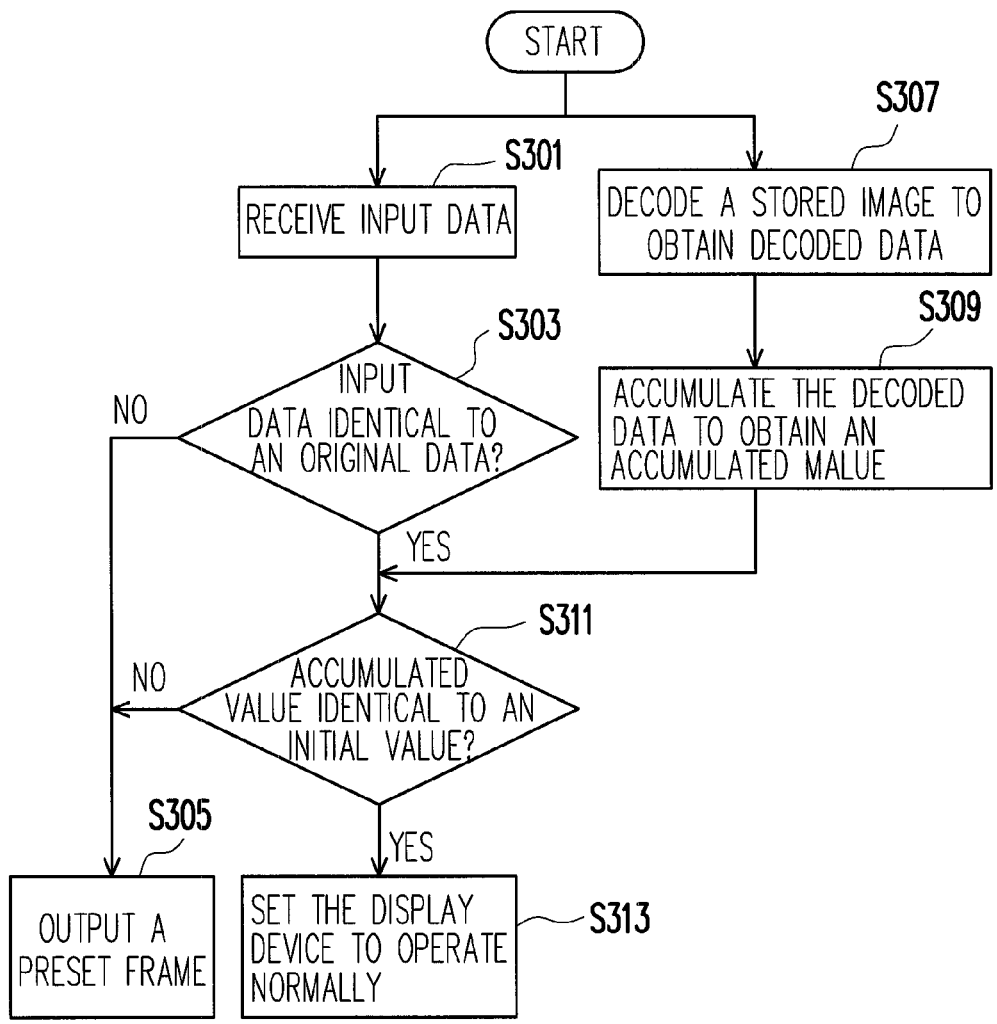
FIG. 3 is a flow chart showing the steps for controlling a display device according to one preferred embodiment of the present invention.

FIG. 3 is a flow chart showing the steps for controlling a display device according to one preferred embodiment of the present invention. As shown in FIGS. 2 and 3, when the display device of the present invention is activated, the driving control unit 212 will control the source driving circuit 205 to drive each data line DL in sequence according to the horizontal synchronous control signal (HSYNCH). Similarly, the driving control unit 212 will control the gate driving circuit 203 to drive each scan line SL in sequence according to the vertical synchronous control signal VSYNCH.

In the present embodiment, when the display device of the present invention is activated, the personal identification circuit 230 will request the user to input data DATA1. After the data DATA1 has been input, the interface unit 232 will receive the user's input data DATA1 according to step S301 and store the data DATA1 temporarily in the SDRAM 253 through the memory control unit 234.

The reason for using an SDRAM 253 in the present embodiment is because the ROM 251 has a slower accessing speed. Hence, the data inside the ROM 251 have to be temporarily stored inside the SDRAM 253 before carrying out a subsequent processing treatment.

After the data DATA1 is temporarily stored inside the SDRAM 253, the comparator 238 will compare the stored data with an original data DATA0 in step S303. If the data DATA1 differs from the original data DATA0 (that is, the answer in step S303 is a 'no'), then the comparator will output a preset frame to the display panel 201 through the video processor in step S305. On the other hand, if the data DATA1 and the original data DATA0 are identical (that is, the answer in step S303 is a 'yes'), the normal starting procedure will be carried out next.

In the present embodiment, the data DATA1 and the original data DATA0 can be a coded series. In addition, the original data DATA0 can be saved into the ROM 251 through an $I^2C$ interface by the owner of the display device.

Furthermore, the aforementioned preset frame in step S305 can be an image of total blackness or total brightness. In other words, when the data DATA1 input by the user differs from the original data DATA0, the display device presents a totally black or a totally white image that the current user is prevented from using the display device in a normal way.

Moreover, in the present invention, the user can saved a stored image to the ROM 251 through the $I^2C$ interface. The user may edit the content of the stored image, for example, the picture of a few greeting words or the image of a photo. The stored image may serve as the aforementioned preset frame. When the data DATA1 differs from the original data DATA0, the stored image is output from the display device to inform anyone nearby the display device of the actual owner.

To prevent anyone who has stolen the display device from cracking the aforementioned code and changing the stored image inside the ROM 251, the present invention also provides a double protection. As shown in FIG. 3, when the display device of the present invention is activated, the decoder 236 will perform step S307 at the same time. That is, the stored image inside the ROM 251 will be decoded through the memory control unit 234 to obtain a decoded data. Next, the decoder 236 will output the decoded data to the accumulator 242 so that the accumulator 242 accumulates the decoded data produced by the decoder 236 to obtain an accumulated value in step S309. When the original data DATA0 and the data DATA1 are identical, the accumulated value obtained in step S309 will compare with an initial value stored inside the ROM 251 in step S311.

In the present invention, the initial value can be the stored image provided by the owner of the display device. After performing the steps from S307 to S309 to obtain the accumulated value, the accumulated value (the initial value) is stored in the ROM 251 through the memory control unit 234. Therefore, any change to the stored image will result in the accumulated value different from the initial value (that is, the answer to the inquiry in step S303 is 'no') and hence step S305 will be carried out. Only when the accumulated value is identical to the initial value (that is, the answer to the inquiry in step S303 is 'yes'), the personal identification circuit 230 will inform the video processor 214. According to the clock signal CLK and the data enable signal DE, the video processor 214 transmits the video data DDATA to the source driving circuit 205 so that the display panel 201 can output images normally as shown step S313.

Figure 4:
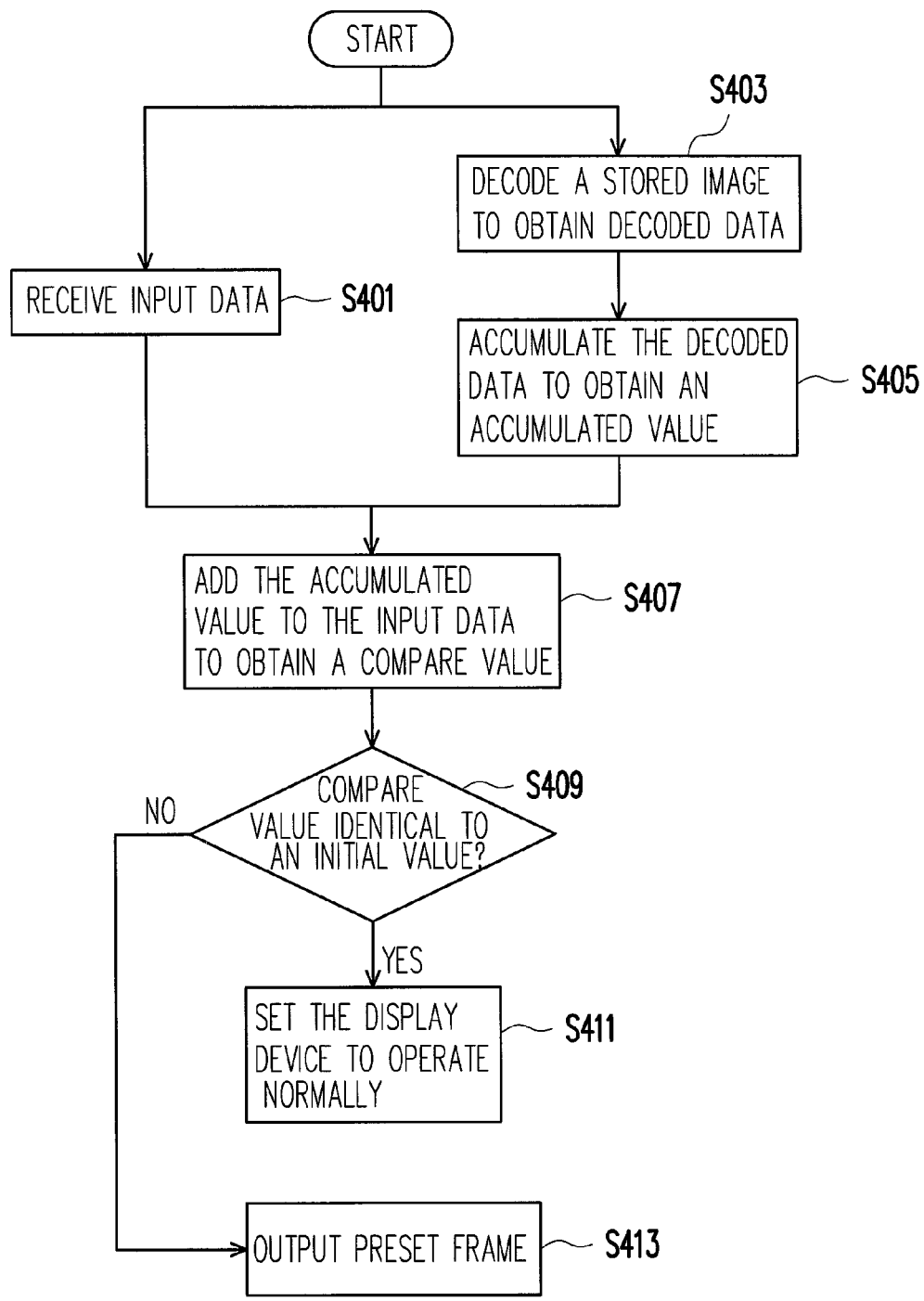
FIG. 4 is a flow chart showing the steps for controlling a display device according to another preferred embodiment of the present invention.

FIG. 4 is a flow chart showing the steps for controlling a display device according to another preferred embodiment of the present invention. To simplify the steps in FIG. 3, the present invention provides an alternative controlling method. Similarly, as in FIGS. 3 and 4, the interface unit 232 will receive the input data DATA1 from the user in step 401 and transfer the data DATA1 to the comparator 238 through the memory control unit 234. The interface unit 232 will transmit the stored image inside the ROM 251 to the decoder 236 through the memory control unit 234. Then, the decoder 236 will decode the stored image to obtain decoded data in step S403. The decoder 236 outputs the decoded data to the accumulator 242 so that the accumulator can accumulate the decoded data to obtain an accumulated value in step S405. The accumulated value is sent to the comparator 238 in step S405 and then the comparator 238 executes step S407. In other words, the accumulated value is added to the data DATA1 to obtain a compared value. Next, the comparator 238 will compare the compared value with the initial value stored in the ROM 251 in step S409.

If the compared value differs from the initial value (that is, the answer to the inquiry in step S409 is 'no'), the comparator 238 will output a preset frame in the display panel 201 through the video processor 214 in step S413. Only when the compared value and the initial value are identical (that is, the answer to the inquiry in step S409 is 'yes'), the display device of the present invention will operate normally in step S411.

The definitions of the data DATA1, the initial value and the preset frame have been explained in detail with reference to FIG. 3. Hence, a detailed explanation is not repeated here.

In some other selected embodiments, when the display device of the present invention can operate normally in step S313 or S411, the comparator 238 may control the decoder 236 to display the stored image inside the ROM 251 on the display panel 201 through the video processor 214. Thus, the display device of the present invention has a memorable significance to the owner.

In summary, the advantages of the present invention at least include the following:

1. The personal identification circuit is set up to determine if the display device is allowed to operate normally by checking the user's input data whenever the display device is initialized. Thus, the desire of stealing the device from the owner is significantly reduced.

2. Because of the double protection provided by the present invention, the display devices will possess clearer identification.

3. Since pictures or preset frames can be displayed before normal operation, the present invention has a higher commercial added value.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
a display panel;
a gate and a source driving circuits, both coupled to the display panel, for driving the display panel; and
a timing control circuit, coupled to the gate and the source driving circuits, for controlling the operations of the gate and the source driving circuits,
wherein the timing control circuit comprises a personal identification circuit, and the personal identification circuit is used for receiving an input data input from a user of the display device; decoding a stored image to obtain decoded data; accumulating the decoded data to obtain an accumulated value; adding the accumulated value to the input data to obtain a compared value; setting the display device to operate normally and output images through the display panel when the compared value is identical to an initial value; and displaying a preset frame on the display panel when the compared value is different from the initial value.

2. The display device according to claim 1, wherein the input data is a coded series.

3. The display device according to claim 1, wherein the preset frame is a totally black frame or a totally white frame.

4. The display device according to claim 1, wherein the stored image is preset by the user of the display device.

* * * * *